United States Patent [19]

Summers

[11] Patent Number: 5,251,919
[45] Date of Patent: Oct. 12, 1993

[54] APPARATUS FOR HOLDING SQUARE ARTICLES

[75] Inventor: Charles E. Summers, Toledo, Ohio
[73] Assignee: Libbey Glass Inc., Toledo, Ohio
[21] Appl. No.: 907,948
[22] Filed: Jul. 2, 1992
[51] Int. Cl.$^5$ .............................................. B25B 11/00
[52] U.S. Cl. .......................................... 279/3; 65/280; 294/64.1; 414/752; 901/40; 269/21
[58] Field of Search .................................. 65/278–280; 279/3, 133, 132; 414/737, 751, 752; 901/40; 294/64.1; 269/21

[56] References Cited

U.S. PATENT DOCUMENTS 1,744,313  1/1930  Kadow ..................................... 279/3
5,172,922  12/1992  Kowaleski et al. ..................... 279/3

Primary Examiner—Steven C. Bishop

[57] ABSTRACT

Apparatus for engaging and holding a non-oriented hot glass container of predetermined square cross sectional contour and closed end that includes a chuck having an open end for receiving the container and an internal valve plate for abutment with the end of the container received in the chuck. The chuck is coupled to a cam-operated arm for lowering the chuck over a container. A transition plate has a square opening contoured to be closely received over the square cross section of the container, and is mounted for free rotation adjacent to the open end of the chuck. Guide fingers project from the plate away from the open end of the chuck so as to engage the container end as the chuck is lowered over the container, and to rotate the plate relative to the chuck so that the plate opening is aligned with the square cross section of the container end. A vacuum is applied to the valve plate within the chuck for holding the container end against the valve plate. Close fit between the transition plate opening and the square cross section of the container restricts flow of air through the opening past the container, and thereby improves the ability to retain and hold the container within the chuck.

10 Claims, 3 Drawing Sheets

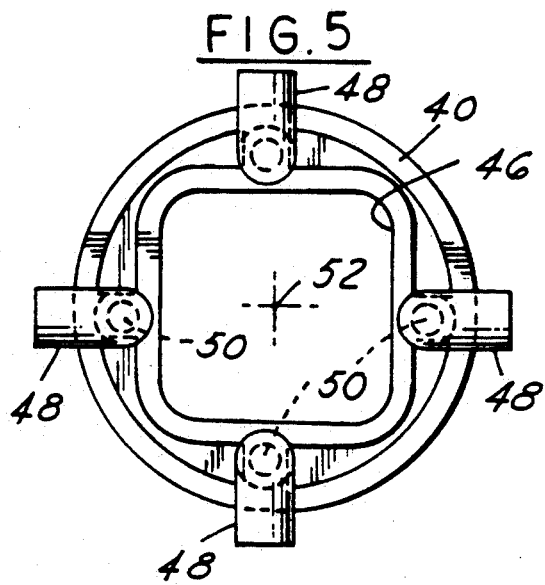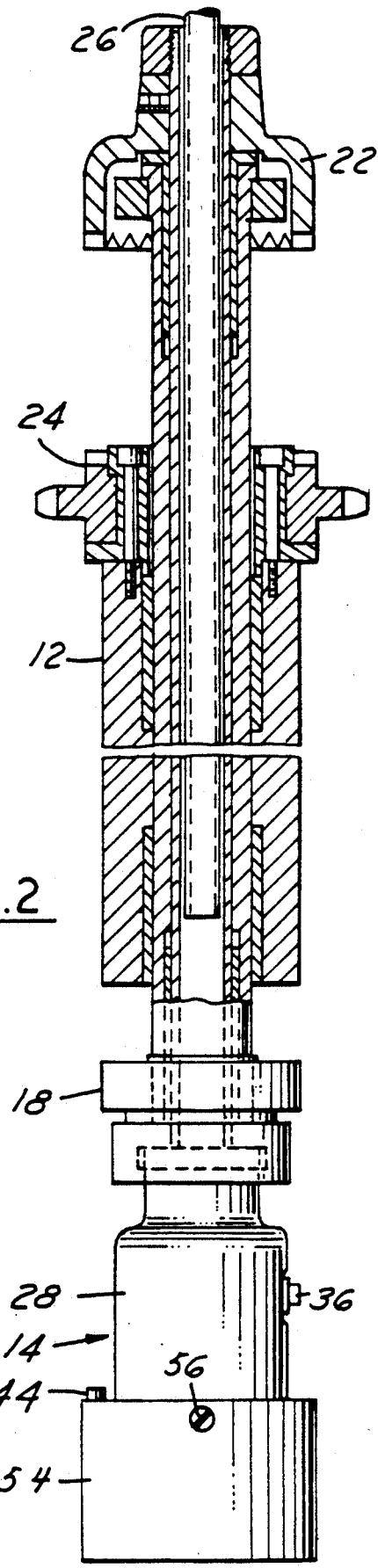

APPARATUS FOR HOLDING SQUARE ARTICLES

The present invention is directed to apparatus for engaging and holding articles of square cross section, and more particularly to vacuum-operated apparatus for engaging and retaining non-oriented hot glass containers of square cross section and closed end.

BACKGROUND AND OBJECTS OF THE INVENTION

Conventional apparatus for engaging and holding articles of square cross section, such as for conveying hot glass containers between stages of a manufacturing process, include a chuck and a mechanism for lowering the chuck over the container (or raising the container into the chuck). The chuck has an internal diameter slightly greater than the diagonal dimension of the container, and an internal valve plate for abutment with the closed end of the container. A vacuum is applied to the valve plate through the spindle that carries the chuck, so that the container whose end is in abutment with the valve plate is held by suction against the valve plate. The chuck and spindle may then be lifted and/or lowered for conveying the container to a subsequent work station. Since the containers are normally in defined position but not in defined angular orientation, the chuck cavity must be cylindrical rather than square to accommodate angular misorientation of the containers. However, spacing between the flat sidewalls of the square container and the opposing internal surface of the chuck pocket provide an open area for air flow, and increase potential for loss of holding vacuum at the valve plate.

Although apparatus of the described character have performed satisfactorily, improvements remain desirable. For example, the leakage of air around the end of the container and the portion of the chuck cavity that surrounds the container sidewall can cause loss of holding force at the valve plate. It is therefore a general object of the present invention to provide a device for accommodating non-orientation of the container cross sections with the chuck while improving vacuum holding force applied by the chuck to the container.

SUMMARY OF THE INVENTION

Apparatus for engaging and holding an angularly non-oriented article of square cross section, such as a hot glass container within predetermined cross sectional contour and closed end, comprises a chuck having an open end for receiving the container and an internal valve plate for abutment with the end of the container received in the chuck. The chuck is coupled to a cam-operated arm for lowering the chuck over a container. A transition plate has a square opening contoured to be closely received over the square cross section of the container, and is mounted for free rotation adjacent to the open end of the chuck. Guide fingers project from the transition plate away from the open end of the chuck so as to engage the container end as the chuck is lowered over the container, and to rotate the transition plate relative to the chuck so that the plate opening is aligned with the square cross section of the container end. A vacuum is applied to the valve plate within the chuck for holding the container end against the valve plate. Close fit between the transition plate opening and the square cross section of the container restricts flow of air through the opening past the container, and thereby improves the ability to retain and hold the container within the chuck.

In the preferred embodiment of the invention, the transition plate is rotatably oriented with respect to orientation of the container cross section by the guide fingers that project from the plate. The guide fingers are disposed in opposed pairs along the sides of the square plate opening, with at least one and preferably both of the pairs being off-center with respect to the center line of the opening in the plate. In this way, it is ensured that the guide fingers will not simultaneously engage the four corners of a container as the chuck is lowered over the container. Preferably, the fingers are of arcuate contour.

BRIEF DESCRIPTION OF THE DRAWINGS

The invention, together with additional objects, features and advantages thereof, will be best understood from the following description, the appended claims and the accompanying drawings in which:

FIG. 2 is a partially sectioned elevational view of a chuck and spindle assembly in the conveyor of FIG. 1;

FIG. 5 is a view taken substantially along the line 5—5 in FIG. 3 that illustrates the transition plate and guide finger arrangement in the pick-up chuck in accordance with the present invention.

DETAILED DESCRIPTION OF PREFERRED EMBODIMENT

Figure 1:
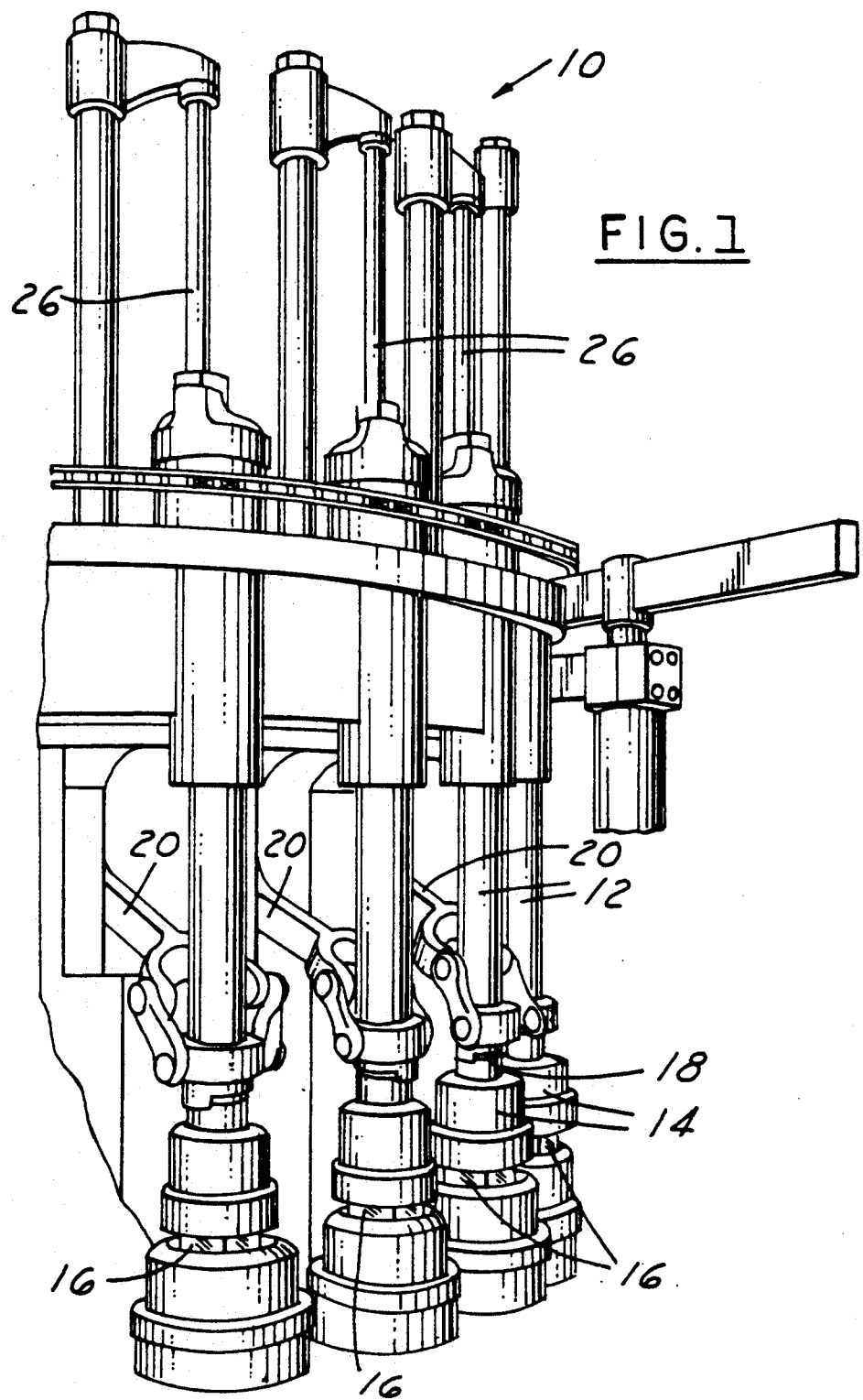
FIG. 1 is a fragmentary perspective view of a conveyor system for hot glass containers of square cross section that includes holding mechanisms in accordance with the present invention.

FIG. 1 illustrates a conveyor system 10 that includes a circumferential array of spindles 12, each of which carries a chuck assembly 14 for engaging and retaining a hot glass container 16 and conveying the container between successive stages of a manufacturing process. Each spindle 12 has a collar 18 engaged by an arm 20 operated by a cam mechanism (not shown) for lowering the associated chuck 14 over a container, and then raising and/or lowering the chuck with the container retained therein. FIG. 2 illustrates the construction of spindle 12 in greater detail, including the mating gears 22,24 for rotating chuck 14, as well as the vacuum tube 26 (FIGS. 1 and 2) that extends downwardly through each spindle 12 for applying vacuum to the associated chuck 14 for retaining a container therein. It will be appreciated, of course, that the term "vacuum" refers to application of sub-atmospheric pressure to the respective chucks 14.

Figure 3:
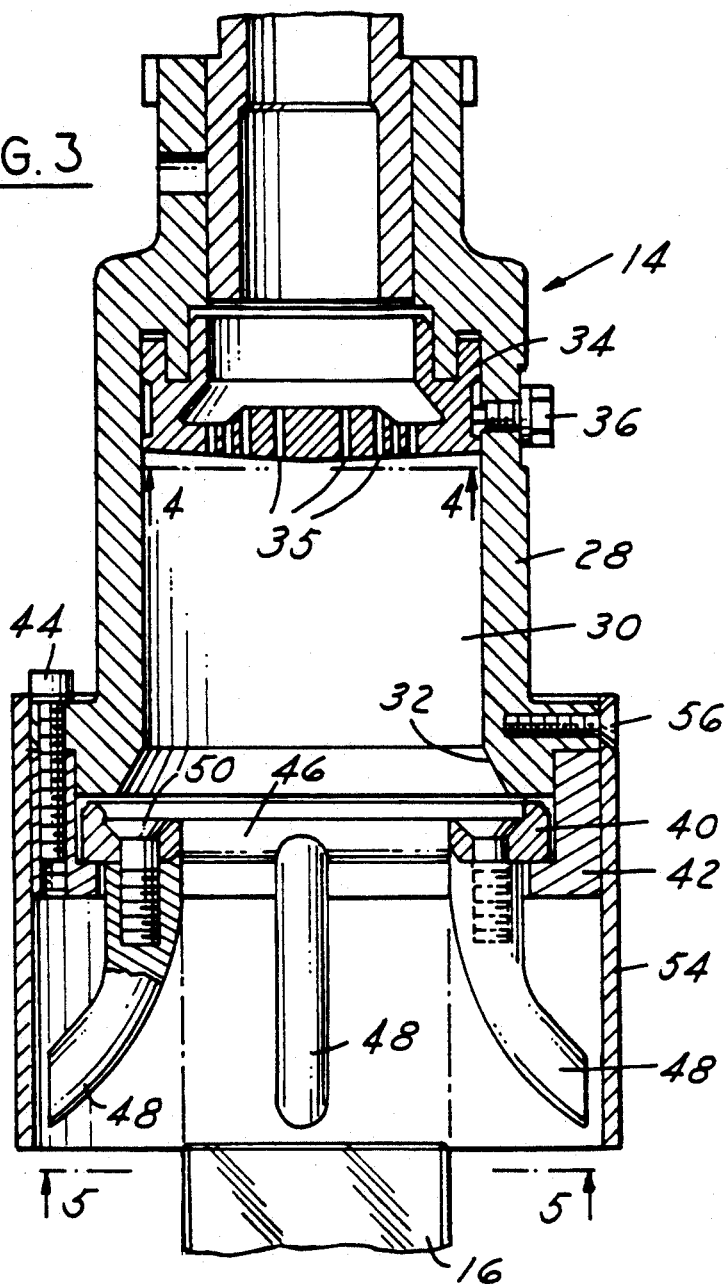
FIG. 3 is a fragmentary sectional view of a pick-up chuck in accordance with a presently preferred embodiment of the invention.
Figure 4:
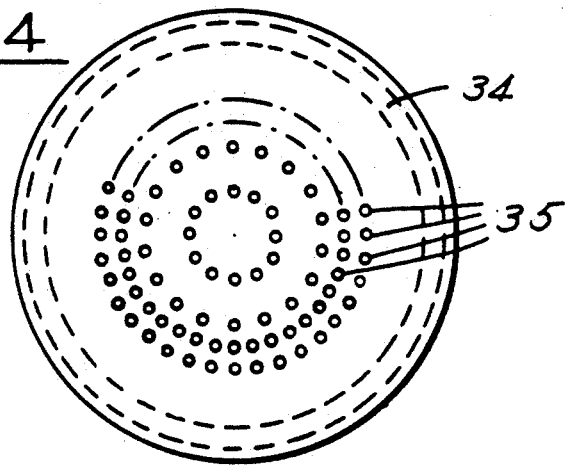
FIG. 4 is a view taken substantially along the line 4—4 in FIG. 3 that illustrates the valve plate in the chuck of FIG. 3.

FIG. 3 illustrates chuck 14 in greater detail. A chuck body 28 of generally cylindrical construction has an upper end that receives vacuum tube 26. Chuck body 28 forms a generally cylindrical cavity 30 of diameter slightly greater than the diagonal dimension of containers 16. Cavity 30 has an outwardly flared open end 32 for receiving the closed end of a container 16. An apertured valve plate 34 is retained by screws 36 spaced from open end 32 for abutment with the closed end of container 16 received within chuck cavity 30. To the extent thus far described, the chuck is of generally conventional construction. The cylindrical contour of chuck cavity 30 accommodates lack of angular orientation of the square cross section of each container 16, and the flared open end 32 is provided to accommodate slight axial misalignment between the container and the axis of the chuck. When the closed end of container 16 abuts valve plate 34, vacuum applied by tube 26 through the apertures 35 of plate 34 hold the container end against the valve plate, so that chuck 14 may thereafter be lifted and/or lowered to convey the container to a subsequent work station.

In accordance with the present invention, a circular transition plate 40 is mounted by an annular keeper 42 and a series of screws 44 adjacent to and coaxially with the open end 32 of chuck cavity 30 while permitting free rotation of plate 40 coaxially with chuck cavity 30. Transition plate 40 has a square central opening 46 of geometry closely coordinated with the square cross sectional geometry of containers 16, so that the containers may be closely received within opening 46 with only a small space between the periphery of opening 46 and the opposing surface of the container sidewall. Four arcuate guide fingers 48 are mounted on transition plate 40 by associated screws 50. Each finger 48 projects away from chuck body 28 and plate opening 46. As best seen in FIG. 5, fingers 48 are mounted to plate 40 in opposed pairs, with one finger being disposed along each lineal edge of plate opening 46. Each pair of fingers 48 is offset from the center line 52 of plate opening 46, which is coaxial with chuck opening 32, chuck cavity 30, vacuum plate 34 and vacuum tube 26. A cover shield 54 is mounted on chuck body 28 by screws 56 for enclosing fingers 48, keeper 42 and transition plate 40.

In operation, as chuck 14 is lowered axially over a container 16 (or the container may be lifted into the chuck), the edges of the container where the sidewalls meet the bottom are initially engaged by arcuate guide fingers 48. These arcuate guide fingers slide along the edges of the container while simultaneously rotating plate 40 with respect to chuck body 28 so as to align square plate opening 46 with the square cross sectional contour of the container. Disposition of fingers 48 in offset pairs, as shown in FIG. 5, ensures that the four guide fingers will not simultaneously engage corners of the container, which could prevent rotation of the guide fingers and transition plate, and potentially jam the mechanism or damage the container.

Guide fingers 48 thus rotate transition plate 40 to a position aligned with the cross sectional contour of container 16 as chuck 14 is initially lowered over the container. Continued downward motion of chuck 14 moves plate 40 over the container sidewalls, and brings the closed end of container 16 into abutment with valve plate 34. Application of vacuum through tube 26 and apertures 35 in plate 34 hold the container bottom against the valve plate. Close fit between transition plate opening 46 and the opposing sidewalls of container 16 restricts flow of air through opening 46 around the container sidewall, and thereby greatly improves the ability of chuck 14 to retain and hold the container.

What is claimed is:

1. Apparatus for engaging and holding an article of square cross section that comprises:
    a chuck having an open end for receiving an article of square cross section and internal means for abutment with an end of the article,
    means for moving said chuck over the article,
    first means rotatably mounted adjacent to said open end of said chuck and having a square opening contoured to be closely received over the square cross section of the article,
    second means projecting from said first means for engaging the article as said chuck is moved over the article to rotate said first means relative to said chuck so that said opening is aligned with said square cross section of the article, and
    means for applying a vacuum to said internal means for holding the article end against said internal means, close fit between said first means opening and said square cross section restricting flow of air through said opening.

2. The apparatus set forth in claim 1 wherein said second means comprise a plurality of guide fingers projecting from said first means and disposed around said opening.

3. The apparatus set forth in claim 2 wherein each of said guide fingers is of arcuate construction projecting away from said opening for camming rotation of said first means.

4. The apparatus set forth in claim 2 wherein said plurality of guide fingers comprises four guide fingers disposed one along each side of said square opening.

5. The apparatus set forth in claim 4 wherein said guide fingers are disposed in opposed pairs, at least one of said pairs being off-center with respect to centerline of said square opening.

6. The apparatus set forth in claim 5 wherein both pairs of said guide fingers are disposed off-center with respect to said centerline.

7. The apparatus set forth in claim 6 wherein each of said guide fingers is of arcuate construction projecting away from said opening for camming rotation of said first means.

8. Apparatus for engaging and holding non-oriented hot glass containers of predetermined square cross section and closed end comprising:
    a chuck having a cylindrical internal cavity, an open end of diameter sufficient to receive one of the containers and internal means spaced from said open end for abutment with the closed end of a container in said cavity,
    means for moving said chuck axially over a container so that the container is received end-wise into the said cavity,
    a plate having a square opening contoured to be closely received over the square cross section of a container,
    means mounting said plate adjacent to said open end of said chuck for free rotation coaxially with said cavity,
    a plurality of guide fingers projecting from said plate in opposed pairs one on each side of said square opening, at least one of said pairs being off-center with respect to centerline of said opening, for engaging a container and rotating said plate so that said plate opening is aligned with said square cross section of the container, and
    means for applying a vacuum to said internal means for holding the container end against said internal means, close fit between said plate opening and the container cross section restricting flow of air through said opening.

9. The apparatus set forth in claim 8 wherein both pairs of said guide fingers are disposed off-center with respect to said center line.

10. The apparatus set forth in claim 9 wherein each of said guide fingers is of arcuate construction projecting away from said opening for camming rotation of said plate.

* * * * *